United States Patent Office 3,019,826
Patented Feb. 6, 1962

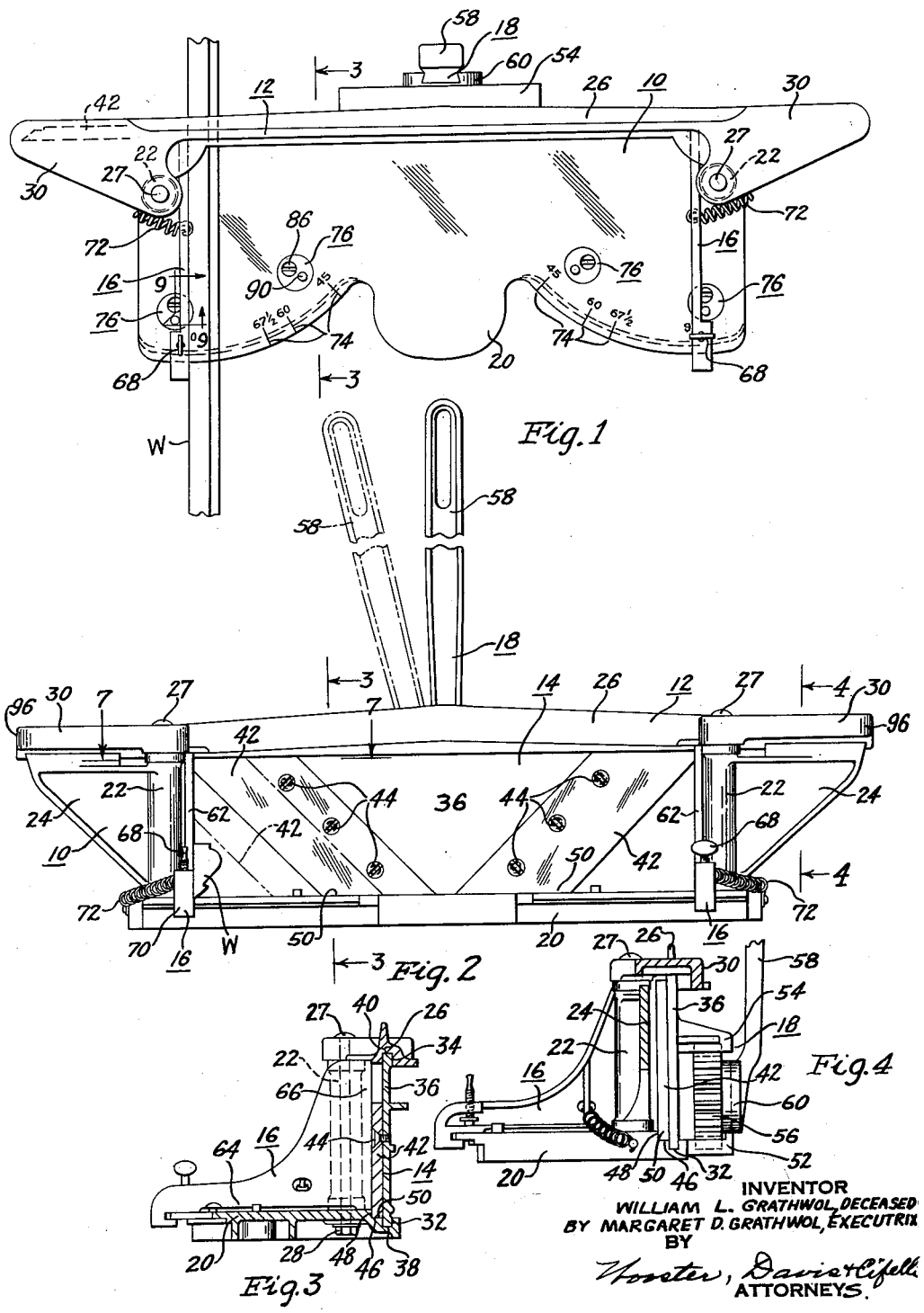

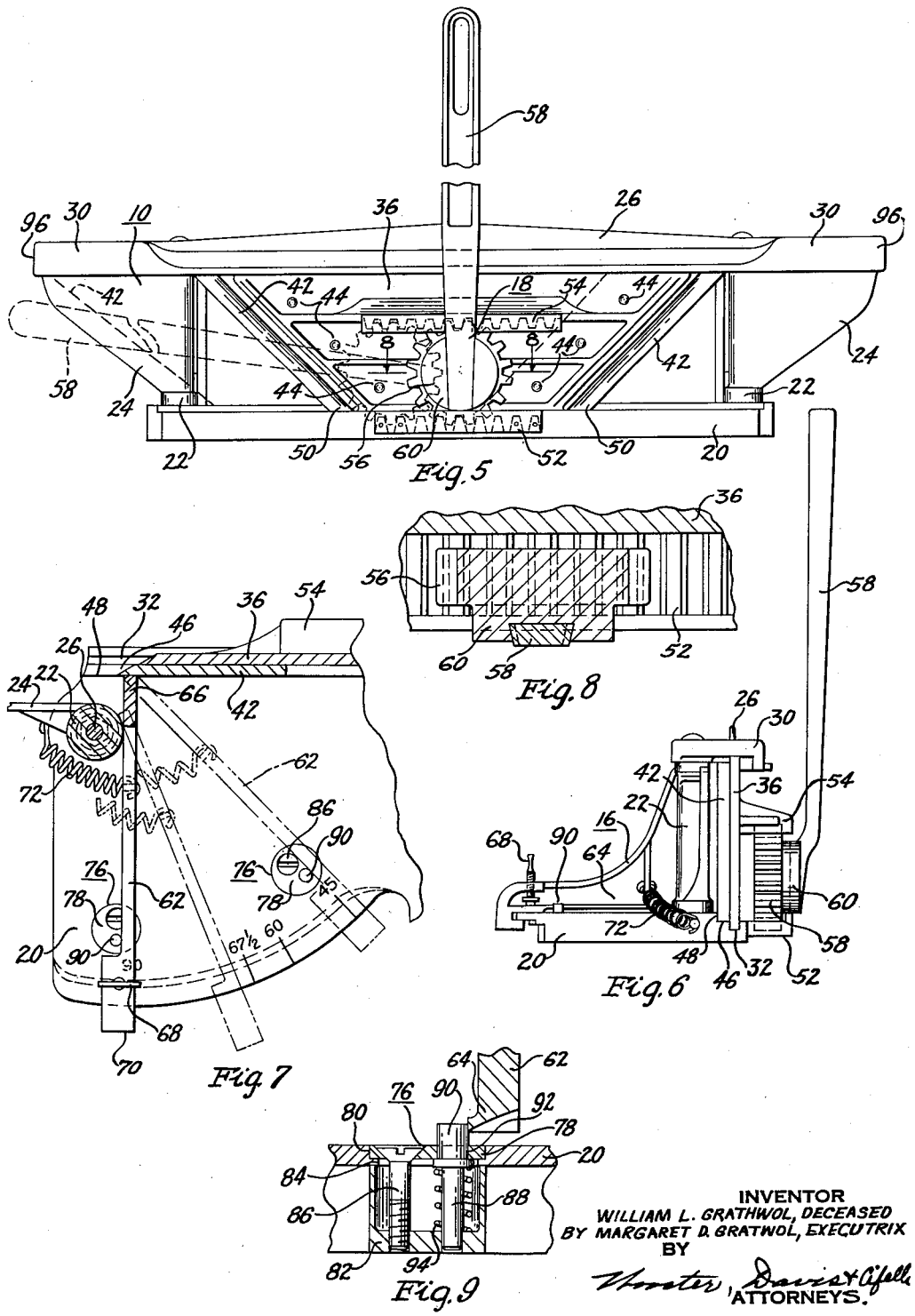

3,019,826
WOOD TRIMMING MACHINE HAVING IMPROVED CUTTER PROTECTIVE MEANS
William L. Grathwol, deceased, late of Stratford, Conn., by Margaret D. Grathwol, executrix, 1422 Broadbridge Ave., Stratford, Conn.
Filed June 2, 1959, Ser. No. 817,618
10 Claims. (Cl. 144—216)

This invention relates to wood cutters generally, and particularly to those which are capable of trimming the ends of pieces of wood.

Wood cutters for trimming the ends of pieces of wood at any desired angle are generally known. One type of known wood cutter employs a cutting means which is manually movable to-and-fro in a horizontal direction. The cutting means comprises cutting blades that are secured at the ends of a cutter carriage so as to be inclined to the vertical and to face the opposite ends of the cutter. Manually operable means are provided for moving the cutter carriage horizontally to cut a piece of wood which is properly disposed relative to the wood cutter. A problem has developed in this type of wood cutter in connection with the hazard which is caused by the cutting blades as they move to-and-fro, and particularly when they approach the limits of their horizontal movement.

It is an object of this invention to provide protective means for the cutting means of a wood cutter, particularly of the type set forth in the preceding paragraph.

The object of this invention is accomplished in one form by providing means including one or more uniquely configured wings which are disposed so as to cooperate with the remainder of the wood cutter to provide a completely protective cover for the tops of the cutter blades regardless of their positions, in addition to providing a protective cover for their front and cutting edges when the cutting blades approach the limits of their horizontal movement.

The above and other objects of the invention and further details of that which is believed to be novel and the invention will be clear from the following description and claims taken with the accompanying drawings, wherein:

FIG. 1 is a top plan view of a wood cutter that incorporates the instant invention, with a piece of wood to be cut associated therewith and some of the parts dotted in one position they may assume during operation;

FIG. 2 is a front elevational view thereof with some of the parts dot-dashed in one position they may assume during operation;

FIG. 3 is a sectional view taken substantially on line 3—3 of FIGS. 1 and 2;

FIG. 4 is a sectional view taken substantially on line 4—4 of FIG. 2;

FIG. 5 is a rear elevational view thereof with some of the parts dotted in one position they may assume during operation;

FIG. 6 is a side elevational view thereof;

FIG. 7 is an enlarged sectional view taken substantially on line 7—7 of FIG. 2 showing some of the parts dot-dashed in positions they may assume during operation thereof;

FIG. 8 is an enlarged sectional view taken substantially on line 8—8 of FIG. 5; and FIG. 9 is an enlarged sectional view taken substantially on line 9—9 of FIG. 1 with the piece of wood omitted.

In the drawings the improved wood cutter is indicated generally by reference numeral 10. The wood cutter 10 generally comprises a built-up frame 12, cutting means 14, wood positioning means 16, and means 18 for moving the cutting means horizontally to-and-fro in the frame 12 to effect cutting of pieces of wood which are positioned in the wood cutter.

The cutter frame 12 is essentially built up of four parts: a cutter bed 20 in the form of a flat horizontally extending member; a pair of spaced vertical supports 22 positioned at the ends of the cutter bed, each of the latter including a front protector 24 for the cutting means in the form of an integral, generally triangular web that extends generally vertically and away from its associated support 22, and an elongated top rail 26, which is supported at spaced points by the tops of the vertical supports 22. The four parts of the frame are secured into a rigid unitary frame assembly by securing means, such as the bolts 27 which pass through appropriate openings in the rail 26, supports 22 and bed 20, and cooperate with the nuts 28 to retain the parts assembled.

The top rail 26 includes at its ends unique integrally formed wings 30. Each wing comprises a flat, generally triangular, horizontal wall-like member. The wings 30 extend at opposite ends of the top rail 26 away from each other and are disposed to completely cover the area at each end of the cutter frame 12 above the vertical supports 22 and the front protectors 24. Near the rear of the cutter bed 20 on its top side there is formed an elongated, generally horizontally extending groove 32, which faces upwardly and comprises a lower guideway for the cutting means 14. An elongated, generally horizontally extending groove 34 is formed in the under side of the top rail 26 and faces downwardly and comprises an upper guideway for the cutting means 14. The groove 34 extends horizontally generally between the vertical supports 22, however, if desired it can extend under the wings 30. The grooves 32 and 34 are spaced, parallel and aligned vertically, and are arranged to support the cutter carriage 36, which is a part of the cutting means 14, for generally horizontal to-and-fro sliding movement.

The cutter carriage 36 comprises a flat, trapezoidal shaped member (when viewed from the front or rear—see FIGS. 2 and 5) having its narrow base disposed at its bottom and its wide base disposed at its top, and having lower and upper guide edges 38 and 40 disposed in guideways 32 and 34, respectively. At each of its sides the carriage 36 rigidly supports a cutter blade 42, which is removably mounted as by means of the screws 44 which are received in appropriate openings formed in the cutter blades and the carriage. As can best be seen in FIGS. 2 and 4, the cutter bed 20 includes a pair of intersecting shoulders 46 and 48 which are adjacent to the groove 32. The lower edges 50 of the cutter blades are adapted to rest on the shoulder 46 and be guided by the shoulder 48. With the foregoing construction, it will be understood that the cutter carriage 36 is slidably guided for horizontal to-and-fro movement by the frame 12.

The means 18 for moving the cutting means 14 comprises a stationary gear rack 52 which is rigidly secured to the cutter bed 20 centrally at the rear thereof, a gear rack 54 that is rigidly secured to the carriage 36 centrally at the rear thereof, the driving gear 56 which meshes with both of the racks and which may be manually rotated by the handle 58. The handle may be detachably secured to the hub 60 of the gear, as by having cooperating tapered portions formed in the hub and handle. As can best be seen in FIG. 5, manually pivoting of the handle 58 results in the gear 56 rotating and riding in the stationary bed rack 52 and causing the carriage rack 54 and the carriage to be horizontally moved. In FIG. 5, counterclockwise movement of the handle 58 results in the carriage 36 being moved horizontally to the left to its dotted position. It will be understood that clockwise movement of the handle 58 will result in the carriage being moved horizontally to its extreme right-hand position.

Movement of the carriage 36 to either side of the cutter bed results in the cutting of a piece of wood in the desired manner if it is properly positioned on the cutter bed. In FIGS. 1 and 2, the piece W of wood is illustrated as being positioned on the cutter bed so as to have its end cut off at an angle of ninety degrees by the left-hand cutter blade 42 on the occurrence of counter-clockwise movement of the handle 58, as viewed in FIG. 2. As can be seen in this figure, when in the dot-dash line position, the cutting edge of the left-hand cutter 42 is about to make cutting contact with the piece W of wood. In FIG. 1 the left-hand cutter 42 is illustrated in dotted lines in its limit position to the left; it will be observed that even in this limit position it is fully disposed beneath the left-hand wing 30. It will be understood by those skilled in the art that as viewed in FIG. 2, other pieces of wood may be cut by the right-hand cutter blade 48 by positioning them at the right-hand end of the cutter bed 20. In the limit position of the right-hand cutter 42 to the right, it is fully disposed beneath the right-hand wing 30.

It will also be understood by those skilled in the art that the means 16 for positioning pieces of wood may be adjusted so as to dispose the wood pieces to have their ends cut off at any desired angle. The means 16 comprises generally similar assemblies at each end of the cutter bed. Each assembly comprises a generally flat, adjustable, vertically disposed positioning plate 62. Each plate 62 is supported on its lower horizontal edge 64 by the top of the cutter bed 20, and is pivotally mounted about a vertical pivot axis which passes generally through its rear vertical edge 66, and includes a vertically adjustable set screw 68 at its front portion 70, and is biased in one direction by an associated compression coiled spring 72. With reference to FIG. 2, it will be observed that the left-hand positioning plate 62 is disposed so as to be biased toward the left in this figure by left-hand spring 72, whereas the right-hand position plate 62 is disposed to be biased toward the right by right-hand spring 72. For convenience, appropriate indicia 74 may be provided at the front of the top of the cutter bed 20 to facilitate setting the positioning means 16 to its desired angular setting.

To further facilitate automatic setting of the positioning plate 62 in angular positions to which they are most frequently set, a plurality of stop pin assemblies 76 may be provided. As can best be seen in FIG. 9, each stop pin assembly comprises a circular disk 78 that is mounted in a circular recess 80 formed in the top of the cutter bed 20, and a cup 82 that is disposed below the cutter bed. An opening 84 is formed in the cutter bed, and it permits securing screws 86 to secure the disk 78 and cup 82 on the cutter bed 20. It will be observed that the stop pin assembly may be adjusted by loosening the screw 86, rotating the assembly, and tightening the screw 86 in the desired location. The stop pin 88 is mounted in the cup 82 and includes a head 90 which projects through an eccentrically disposed opening 92 formed in the disk 78 above the cutter bed 20. The pin stop 88 is normally biased to an upwardly projecting position by the compression spring 94. However, the pin head 90 may be retracted to permit the lower edge 64 of its associated positioning plate 62 to pass over it. It will, therefore, be observed that the positioning plates 62 may be individually adjusted to any position within the limits of their pivotal movement, and temporarily fixed therein by the set screws 68 to properly position pieces of wood to effect the desired angle of cut, or automatically positioned by a pin stop assembly, and that cutting movement may be selectively effected by pivoting the handle 58 in the proper direction.

It will be observed, particularly from FIGS. 2 and 5, that when a cutter blade reaches an extreme end position, portions of it project beyond the end of the cutter bed 20. In view of the fact that the leading edges of the cutter blades are extremely sharp, in order to cut effectively, and that the upper ends of the cutter blades are somewhat pointed, being angled at the corners of the blades, it will be recognized that the cutter blades would constitute a serious hazard during operation if means were not provided for properly protecting the user from the leading edges of the cutter blades. Therefore, the front protectors 24 are utilized to protect the user principally on the front side of the cutter frame, but also from the ends thereof, because the cutter blades in their extreme positions are covered fully on their front by the protectors 24 and do not extend beyond the ends of the protectors 24. In the absence of protective structure in addition to protectors 24, which was all the prior art provided, it will be recognized that a hazard still exists, because the user might inadvertently come into contact with the tops of the leading edges of the cutter blades. In order to preclude this possibility, the novel wings 30 are provided, and as can best be seen in FIG. 1, they cooperate with the top rail 26 to completely cover the top edges of the cutter carriage and the cutter blades during the operation of the wood cutter, regardless of the horizontal positions to which these parts have been moved. In order to enhance the protective capacity of the wings 30, a depending skirt 96 is provided substantially completely around the sides of the wings, as can best be seen in FIGS. 2 and 5. It will be understood that the cooperative relationship of the front protectors 24 and the wings 30 is such as to prevent the inadvertent contact of the user with the cutter blades from the front, ends and top of the frame, and that the only danger to the user flows from the free leading edges of the cutter blades when the latter are in intermediate cutting positions, which hazard, of course, cannot be eliminated in a wood cutter of this type.

As will be evident from the foregoing description, certain aspects of the invention are not limited to the particular details of construction of the example illustrated, and it is contemplated that various and other modifications and applications will occur to those skilled in the art. It is, therefore, the intention that the appended claims shall cover such modifications and applications as do not depart from the true spirit and scope of the invention.

What is claimed as new and desired to secure by Letters Patent of the United States is:

1. A wood trimming machine comprising: a generally horizontally extending cutter frame; a carriage supported by said frame for horizontal to-and-fro movement relative thereto; a cutter blade secured to one end of said carriage and facing toward one end of said frame; means for positioning wood pieces on said frame in position to be cut by said cutter blade; means for moving said carriage to cut such a positioned piece of wood; and horizontally extending means supported by said frame and disposed so as to cover the top of said cutter blade regardless of its horizontal position, said horizontally extending means including a depending skirt which substantially surrounds the upper edge of said cutter blade when said cutter blade is disposed in the vicinity of the end toward which it faces, whereby the user of said wood cutter is protected from unintentional contact with said cutter blade from the top thereof during operation of said wood cutter.

2. A machine as defined in claim 1 wherein said carriage comprises a generally flat vertically oriented slide that is slidably supported in a pair of vertically spaced horizontal extending guideways formed in said frame.

3. A machine as defined in claim 2 wherein said top guideway is formed in a horizontally extending rail which forms a part of said frame and is part of said cutter blade covering means, and said cutter blade covering means also includes a generally flat horizontal wall-like wing which extends from said rail at one end thereof.

4. A machine as defined in claim 1 wherein a second cutter blade is secured to said carriage at the other end of said carriage and faces the other end of said frame; said positioning means includes mechanism for positioning wood pieces on said frame in position to be cut by said second cutter blade; and said cutter blade covering means includes portions which cover the top of said second cutter blade regardless of its horizontal position.

5. A machine as defined in claim 4 wherein said cutter blade covering means includes generally flat horizontal wall-like wings which extend horizontally from opposite ends of said frame.

6. A machine as defined in claim 1 wherein said cutter blade is disposed at an angle relative to the horizontal.

7. A machine as defined in claim 1 wherein said positioning means comprises a generally flat vertically extending wall member that is adjustably pivotally mounted at one of its vertical sides about a vertical axis whereby it is arranged to function as an adjustable backstop for wood pieces that are to be cut.

8. A machine as defined in claim 1 wherein said moving means comprises: a gear rack rigidly formed on said frame; a gear rack rigidly formed on said carriage and spaced from and parallel to said frame gear rack; a gear disposed between and meshing with said gear racks; and means for selectively turning said gear.

9. A wood trimming machine comprising: a frame having a generally horizontally extending cutter bed; said cutter bed having a generally horizontally extending elongated guideway formed therein; said frame supporting a generally horizontally extending rail having an elongated guideway formed therein which is spaced above, parallel to and aligned with the guideway formed in said bed; a carriage slidably supported in said guideways for horizontal to-and-fro movement; said carriage having a cutter blade secured thereto at one of its ends which faces one end of said frame; means for positioning wood pieces on said bed in position to be cut by said cutter blade; means for moving said carriage horizontally to cut such a positioned piece of wood; and a generally flat, vertical front protector and generally flat horizontal wall-like wing including a depending skirt which extend from said rail at the end thereof toward which said cutter blade faces, said protector and wing being arranged to cover the front and top of said cutter blade when it is disposed in the vicinity of the end toward which said cutter blade faces.

10. A machine as defined in claim 9 wherein a second cutter blade is secured to said carriage at the other of its ends and faces the other end of said frame; said positioning means includes mechanism for positioning wood pieces on said bed in position to be cut by said second cutter blade; and a generally flat, vertical front protector and generally flat horizontal wall-like wing including a depending skirt is provided which extends from said rail at the end thereof toward which said second cutter blade faces; said last-named protector and wing being arranged to cover the front and top of said second cutter blade when it is disposed in the vicinity of the end toward which said second cutter blade faces.

References Cited in the file of this patent

UNITED STATES PATENTS

| 504,209 | Fox | Aug. 29, 1893 |
| 652,136 | Oliver | June 19, 1900 |
| 705,324 | Crismore | July 22, 1902 |
| 761,361 | Dake | May 31, 1904 |
| 856,210 | Battensby | June 11, 1907 |
| 963,344 | Whitney | July 5, 1910 |
| 1,144,844 | Hollis | June 29, 1915 |

FOREIGN PATENTS

| 14,163 | Great Britain | of 1889 |